(12) United States Patent
Danilov et al.

(10) Patent No.: US 10,152,248 B2
(45) Date of Patent: Dec. 11, 2018

(54) ERASURE CODING FOR ELASTIC CLOUD STORAGE

(71) Applicant: EMC Corporation, Hopkinton, MA (US)

(72) Inventors: Mikhail Danilov, Saint Petersburg (RU); Maxim Trusov, Saint Petersburg (RU); Ivan Tchoub, Saint Petersburg (RU); Gregory Skripko, Saint Petersburg (RU); Vladimir Prikhodko, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/193,407

(22) Filed: Jun. 27, 2016

(65) Prior Publication Data
US 2017/0185330 A1   Jun. 29, 2017

(30) Foreign Application Priority Data
Dec. 25, 2015 (RU) .................. 2015155753

(51) Int. Cl.
  *G06F 12/00*  (2006.01)
  *G06F 3/06*   (2006.01)
  *H04L 29/08*  (2006.01)

(52) U.S. Cl.
  CPC ........... *G06F 3/0619* (2013.01); *G06F 3/065* (2013.01); *G06F 3/067* (2013.01); *H04L 67/1097* (2013.01); *H04L 67/32* (2013.01)

(58) Field of Classification Search
  CPC ........ G06F 3/0619; G06F 3/065; G06F 3/067; H04L 67/1097; H04L 67/32
  See application file for complete search history.

(56) References Cited

U.S. PATENT DOCUMENTS

| | | | |
|---|---|---|---|
| 6,070,003 A | 5/2000 | Gove et al. | |
| 6,550,035 B1 | 4/2003 | Okita | |
| 7,549,110 B2 | 6/2009 | Stek et al. | |
| 7,559,007 B1 | 7/2009 | Wilkie | |
| 7,581,156 B2 | 8/2009 | Manasse | |
| 8,458,515 B1 | 6/2013 | Saeed | |
| 8,532,212 B2 | 9/2013 | Ito | |
| 8,683,296 B2 | 3/2014 | Anderson et al. | |
| 8,683,300 B2 | 3/2014 | Stek et al. | |
| 8,762,642 B2 * | 6/2014 | Bates | G06F 11/2064 711/117 |
| 8,914,706 B2 | 12/2014 | Anderson | |
| 9,053,114 B1 * | 6/2015 | Lemar | G06F 12/0802 |
| 2005/0038968 A1 * | 2/2005 | Iwamura | G06F 11/2058 711/162 |

(Continued)

OTHER PUBLICATIONS

U.S. Appl. No. 15/281,172, filed Sep. 30, 2016, Trusov et al.

(Continued)

*Primary Examiner* — Kalpit Parikh
(74) *Attorney, Agent, or Firm* — Daly, Crowley, Mofford & Durkee, LLP

(57) ABSTRACT

Systems and methods for efficiently protecting data within a distributed storage system using erasure coding. Unnecessary network traffic can be eliminated by scheduling executing erasure coding tasks on storage nodes that have local copies of data. Encoding may be performed in parallel by multiple nodes to reduce elapsed encoding time.

18 Claims, 7 Drawing Sheets

(56) References Cited

U.S. PATENT DOCUMENTS

| | | | |
|---|---|---|---|
| 2006/0105724 A1 | 5/2006 | Nakao | |
| 2006/0147219 A1 | 7/2006 | Yoshino et al. | |
| 2007/0177739 A1* | 8/2007 | Ganguly | H04L 12/1881 380/277 |
| 2008/0126357 A1* | 5/2008 | Casanova | G06F 17/30215 |
| 2009/0112953 A1 | 4/2009 | Barsness et al. | |
| 2010/0091842 A1 | 4/2010 | Ikeda et al. | |
| 2010/0180176 A1 | 7/2010 | Yosoku et al. | |
| 2010/0246663 A1 | 9/2010 | Citta et al. | |
| 2011/0053639 A1 | 3/2011 | Etienne Suanez et al. | |
| 2011/0055494 A1 | 3/2011 | Roberts et al. | |
| 2011/0196900 A1 | 8/2011 | Drobychev et al. | |
| 2012/0051208 A1 | 3/2012 | Li et al. | |
| 2012/0106595 A1 | 5/2012 | Bhattad et al. | |
| 2013/0067187 A1 | 3/2013 | Moss et al. | |
| 2014/0046997 A1 | 2/2014 | Dain et al. | |
| 2014/0047040 A1* | 2/2014 | Patiejunas | H04L 51/24 709/206 |
| 2016/0239384 A1 | 8/2016 | Slik et al. | |
| 2017/0046127 A1 | 2/2017 | Fletcher et al. | |

OTHER PUBLICATIONS

U.S. Appl. No. 15/398,832, filed Jan. 5, 2017, Danilov et al.
U.S. Appl. No. 15/398,826, filed Jan. 5, 2017, Danilov et al.
U.S. Appl. No. 15/398,819, filed Jan. 5, 2017, Danilov et al.
Anvin, "The Mathematics of RAID-6;" First Version Jan. 20, 2004; Last Updated Dec. 20, 2011; Retrieved from https://www.kernel.org/pub/linux/kernel/people/hpa/raid6.pdf; 9 Pages.
Blömer et al., "An XOR-Based Erasure-Resilient Coding Scheme;" Article from CiteSeer; Oct. 1999; 19 Pages.
U.S. Appl. No. 14/929,788, filed Nov. 2, 2015, Kurilov et al.
U.S. Appl. No. 15/083,324, filed Mar. 29, 2016, Danilov et al.
U.S. Appl. No. 15/193,144, filed Jun. 27, 2016, Kurilov et al.
U.S. Appl. No. 15/193,141, filed Jun. 27, 2016, Danilov et al.
U.S. Appl. No. 15/186,576, filed Jun. 20, 2016, Malygin et al.
U.S. Appl. No. 15/193,145, filed Jun. 27, 2016, Fomin et al.
U.S. Appl. No. 15/193,142, filed Jun. 27, 2016, Danilov et al.
U.S. Appl. No. 15/193,409, filed Jun. 27, 2016, Trusov et al.
U.S. Appl. No. 15/620,892, filed Jun. 13, 2017, Danilov et al.
U.S. Appl. No. 15/620,897, filed Jun. 13, 2017, Danilov et al.
U.S. Appl. No. 15/620,898, filed Jun. 13, 2017, Danilov et al.
U.S. Appl. No. 15/620,900, filed Jun. 13, 2017, Danilov et al.
Response to U.S. Non-Final Office Action dated Nov. 27, 2017 for U.S. Appl. No. 15/186,576; Response filed Feb. 23, 2018; 7 pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
U.S. Non-Final Office Action dated Feb. 2, 2018 for U.S. Appl. No. 15/398,826; 16 Pages.
Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 18, 2017 from U.S. Appl. No. 15/193,145, filed Jan. 17, 2018; 12 Pages.
U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.

* cited by examiner

ERASURE CODING FOR ELASTIC CLOUD STORAGE

CROSS REFERENCE TO RELATED APPLICATIONS

This application claims priority to Russian Application Number 2015155753, filed on Dec. 25, 2015, entitled "ERASURE CODING FOR ELASTIC CLOUD STORAGE," which is incorporated herein by reference in its entirety.

BACKGROUND

As is known in the art, distributed storage systems (or "clusters") may provide a wide range of storage services, while achieving high scalability, availability, and serviceability. Some distributed storage systems—including Elastic Cloud Storage (ECS) from EMC Corporation of Hopkinton, Mass.—use erasure coding for data protection.

SUMMARY

Existing implementations of erasure coding within distributed storage systems may be inefficient in terms of generated network traffic and elapsed encoding time.

According to one aspect of the disclosure, method is provided use with a distributed storage system comprising a plurality of storage nodes each having attached storage devices. The method may include: receiving a request from a client to store data; storing a copy of the data within the storage devices attached to a first storage node; storing a copy of the data within the storage devices attached to a second storage node; returning an acknowledgement to the client; scheduling a first erasure encoding task on the first storage node; scheduling a second erasure encoding task on the second storage node; executing, on the first storage node, the first erasure encoding task to generate a first plurality of coded fragments using the copy of the data stored within attached storage devices; executing, on the second storage node, the second erasure encoding task to generate a second plurality of coded fragments using the copy of the data stored within attached storage devices; and storing the first and second pluralities of coded fragments within storage devices attached to at least two different storage nodes.

In some embodiments, returning an acknowledgement to the client occurs before scheduling the first or second erasure encoding tasks.

In various embodiments, the method further includes dividing the data into a plurality of data fragments and storing the plurality of data fragments within storage devices attached to at least two different storage nodes. The data fragments and coded fragments can be stored in different nodes. In certain embodiments each of the data fragments have the same size.

In some embodiments, the method further comprises: deleting the copy of the data from the storage devices attached to a first storage node and deleting the copy of the data from the storage devices attached to a first second node.

In certain embodiments, the first and second erasure encoding tasks are executed in parallel. In particular embodiments, scheduling the first erasure encoding task on the first storage node comprises adding the first erasure encoding task to a queue within the second storage node.

According to another aspect of the disclosure, a distributed storage system includes: a plurality of storage nodes having attached storage devices. A first storage node from the plurality of storage nodes may have attached storage devices and be configured to: receive a request from a client to store data; store a copy of the data within the storage devices attached to a second storage node; store a copy of the data within the storage devices attached to a third storage node; return an acknowledgement to the client; schedule a first erasure encoding task on the second storage node; and schedule a second erasure encoding task on the third storage node. The second storage node may have attached storage devices and be configured to: execute the first erasure encoding task to generate a first plurality of coded fragments using the copy of the data stored within attached storage devices; and store the first plurality of coded fragments within storage devices attached to at least two different storage nodes. The third storage node may have attached storage devices and be configured to: execute the second erasure encoding task to generate a second plurality of coded fragments using the copy of the data stored within attached storage devices; and store the second plurality of coded fragments within storage devices attached to at least two different storage nodes.

In some embodiments, the first storage node is configured to return an acknowledgement to the client occurs before scheduling the first or second erasure encoding tasks.

In various embodiments, the first storage node is configured to divide the data into a plurality of data fragments and store the plurality of data fragments within storage devices attached to at least two different storage nodes. The data fragments and coded fragments may be stored in different storage nodes. In certain embodiments, the data fragments each have the same size.

In some embodiments, the second and third storage nodes are further configured to delete the copy of the data from their attached storage devices. In particular embodiments, the first and second erasure encoding tasks are executed in parallel. In certain embodiments, the first storage node is configured to add the first erasure encoding task to a queue within the second storage node.

In some embodiments, the techniques described herein can eliminate unnecessary network traffic by scheduling and executing erasure coding tasks on storage nodes that have local copies of data. In certain embodiments, erasure coding tasks are executed in parallel on multiple different nodes, thereby reducing the elapsed encoding time. In various embodiments, the techniques can be used with ECS and other distributed systems that use erasure coding.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

Figure 1:
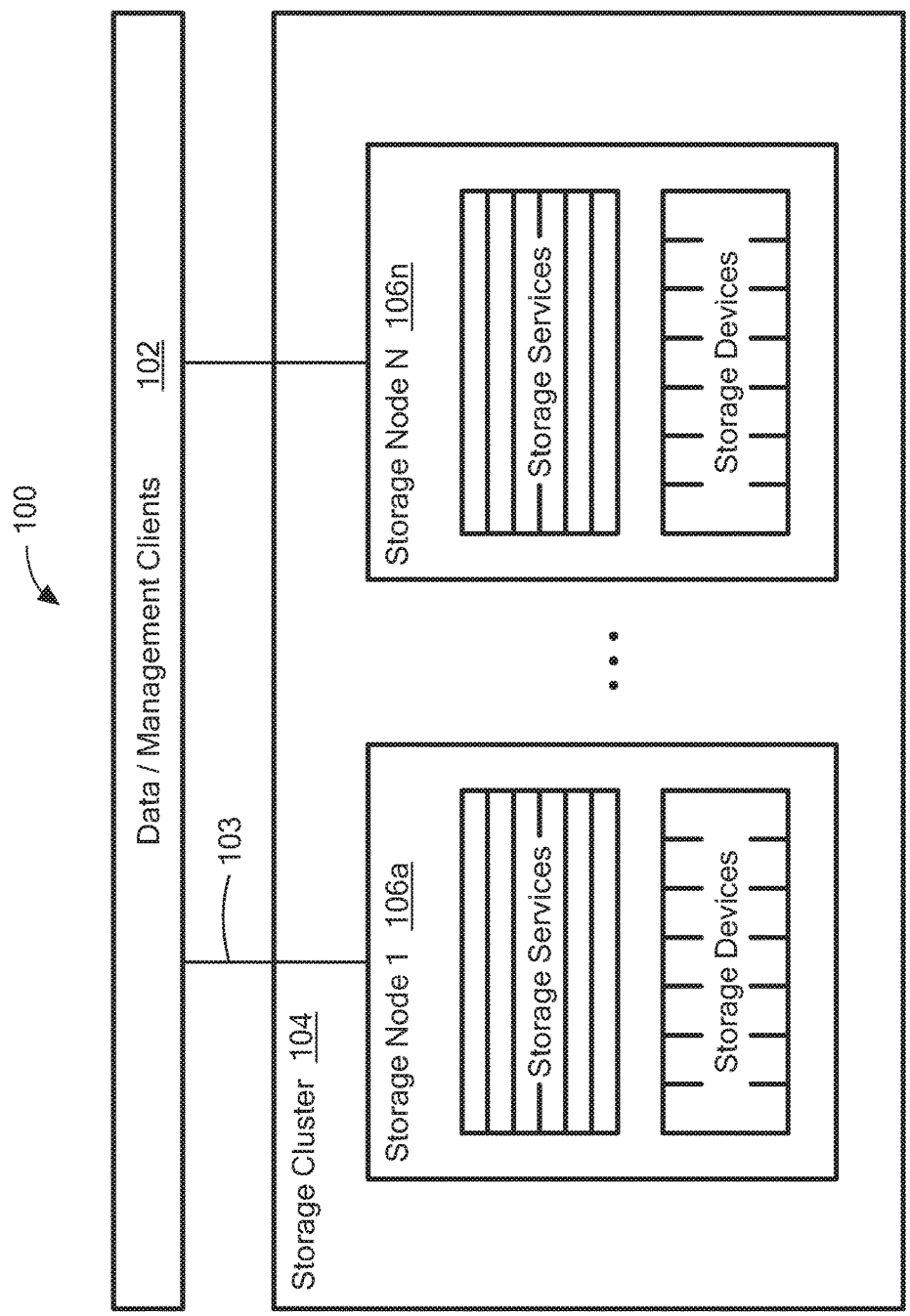
FIG. 1 is a block diagram of an illustrative distributed storage system, in accordance with an embodiment of the disclosure.
Figure 1A:
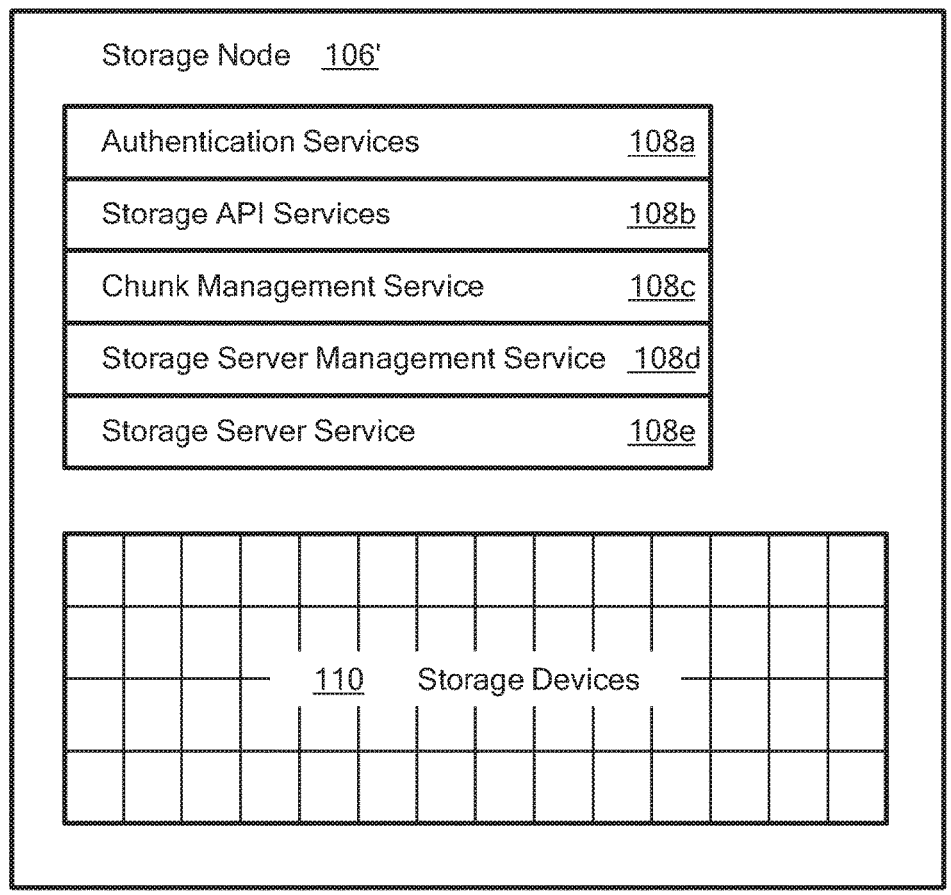
FIG. 1A is a block diagram of an illustrative storage node which may form a part of the distributed storage system of FIG. 1, in accordance with an embodiment of the disclosure.

FIG. 1 shows a distributed storage system, in accordance with an embodiment of the disclosure. An illustrative distributed storage system 100 includes one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols. The clients 102 may include user applications, application servers, data management tools, and/or testing systems. The storage cluster 104 includes one or more storage nodes 106a . . . 106n (generally denoted 106). An illustrative storage node is shown in FIG. 1A and described below in conjunction therewith.

In general operation, clients 102 issue requests to the storage cluster 104 to read and write data. Write requests may include requests to store new data and requests to update previously stored data. Data read and write requests include an ID value to uniquely identify the data within the storage cluster 104. A client request may be received by any available storage node 106. The receiving node 106 may process the request locally and/or may delegate request processing to one or more peer nodes 106. For example, if a client issues a data read request, the receiving node may delegate/proxy the request to peer node where the data resides. In various embodiments, the cluster 104 uses erasure coding to protect data stored therein, as described below in conjunction with FIGS. 2-4.

In various embodiments, the distributed storage system 100 comprises an object storage system, wherein data is read and written in the form of objects, which are uniquely identified by object IDs. In some embodiments, the storage cluster 104 utilizes Elastic Cloud Storage (ECS) from EMC Corporation of Hopkinton, Mass.

In some embodiments, the system 100 employs a flat cluster architecture whereby cluster-level services are distributed evenly among the nodes. To implement cluster-level services using a flat cluster architecture, processing may be coordinated and shared among several nodes using the concept of object ownership. An object stored within the system 100, including system objects and user data, may be owned by a single node 106 at any given time. When a node owns an object, it may be solely responsible for handling updates to the object or for performing other processing associated with the object. Notably, a given node may own an object (e.g., user data) without having a copy of that object's data stored locally (i.e., the object data can be stored on one or more remote nodes).

FIG. 1A shows a storage node, in accordance with an embodiment of the disclosure. A storage node 106' may be the same as or similar to a storage node 106 in FIG. 1. The illustrative storage node 106' includes one or more services 108 and one or more storage devices 110, as shown. A storage node 106' may include a processor (not shown) configured to execute instructions provided by services 108.

In the example shown, a storage node 106' includes the following services: an authentication service 108a to authenticate requests from clients 102; storage API services 108b to parse and interpret requests from clients 102; a storage chunk management service 108c to facilitate storage chunk allocation/reclamation for different storage system needs and monitor storage chunk health and usage; a storage server management service 108d to manage available storage devices capacity and to track storage devices states; and a storage server service 108e to interface with the storage devices 110.

A storage device 110 may comprise one or more physical and/or logical storage devices attached to the storage node 106a. A storage node 106 may utilize VNX, Symmetrix VMAX, and/or Full Automated Storage Tiering (FAST), which are available from EMC Corporation of Hopkinton, Mass. While vendor-specific terminology may be used to facilitate understanding, it is understood that the concepts, techniques, and structures sought to be protected herein are not limited to use with any specific commercial products.

Figure 2:
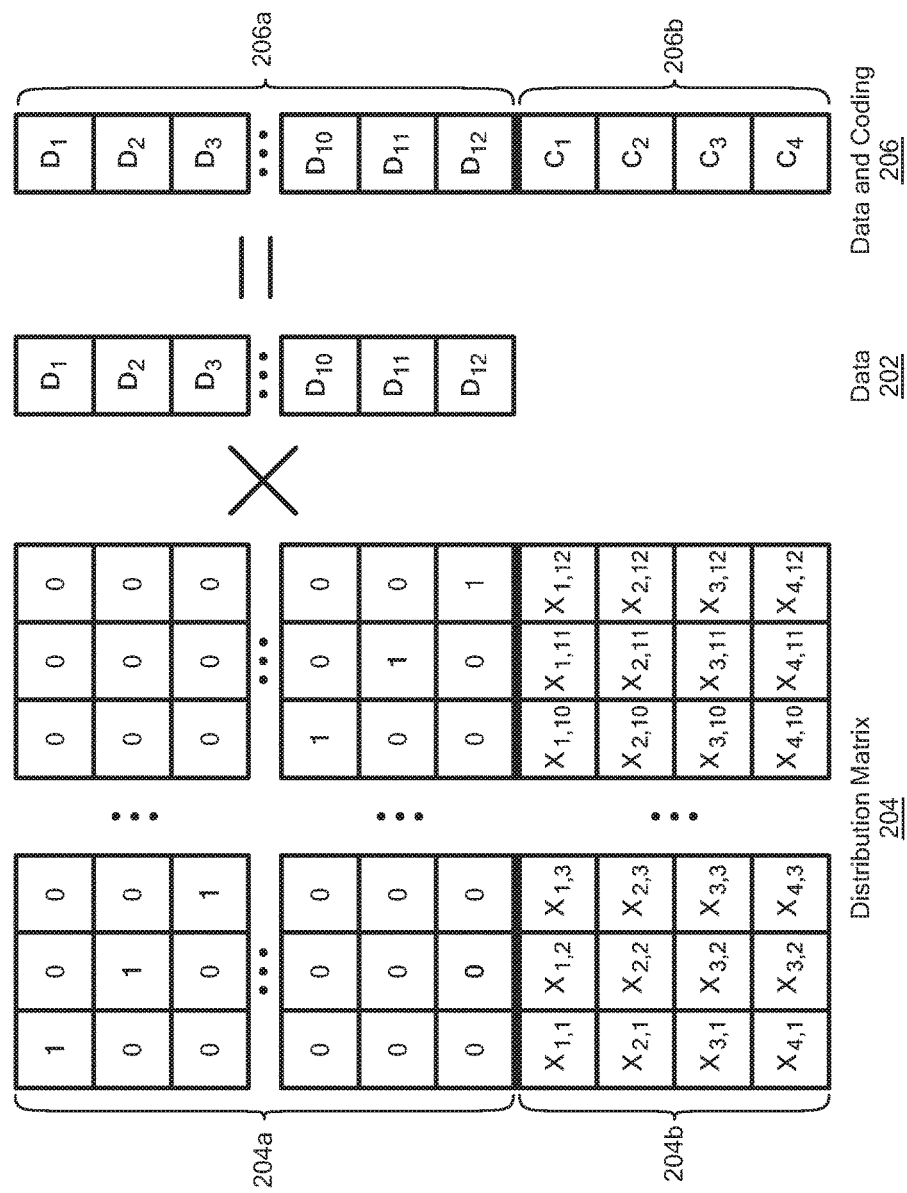
FIG. 2 is a diagram of an illustrative erasure coding technique that may be used within a distributed storage system, in accordance with an embodiment of the disclosure.

Referring to FIG. 2, a distributed storage system may use erasure coding for data protection. Arbitrary data D may be divided into k fragments $D_1, D_2, \ldots, D_k$, which can be arranged as a column vector 202. All k fragments have equal size, with padding or other data complement being added as needed. The data column vector 202 can be multiplied with a distribution matrix 204 to generate m coded fragments $C_1, C_2, \ldots, C_m$. The coded fragments are considered to be "redundant" because they encode information that can be used to restore data fragments. In some embodiments, k is chosen to be 12 and m is chosen to be 4.

The distribution matrix 204 may be a (k+m)×k matrix comprising a first sub-matrix 204a having k rows and a second sub-matrix (referred to as the "coding matrix") 204b having m rows. The first sub-matrix 204a may be an identity matrix, as shown. In this form, the distribution matrix 204 can be multiplied by a data column vector 202 to result in a data-and-coding column vector 206 comprising the k data fragments 206a and the m coded fragments 206b.

The coding matrix 204b includes coefficients $X_{i,j}$ which may be selected using known erasure coding techniques. In some embodiments, the coding coefficients are selected such that the system can tolerate the loss of any m fragments. The coefficients $X_{i,j}$ may be selected based upon a specific erasure coding algorithm used.

It will be appreciated that the encoding process can be performed as m independent dot products using individual rows from the coding matrix 204b and the data column vector 202. In particular, the $i^{th}$ coded fragment $C_i$ can be calculated as the dot product of the $i^{th}$ row of the coding matrix 204b with the data column vector 202. In some embodiments, the system takes advantage of this fact to perform parallel coding across multiple storage nodes, as described further below in conjunction with FIG. 3D.

The data fragments $D_1, D_2, \ldots, D_k$ and coded fragments $C_1, C_2, \ldots, C_m$ may be distributed among the cluster storage nodes 106 (FIG. 1). The specific distribution of fragments-to-nodes (referred to as the "data layout") can be selected using a various criteria. For example, in some applications, the goal may be to store exactly one fragment per storage node 106.

If a data fragment $D_1, D_2, \ldots, D_k$ is lost (e.g., due to a node failure, a storage device failure, or data corruption), the lost fragment may be regenerated using a decoding matrix (not shown), available data fragments from $D_1, D_2, \ldots, D_k$, and coded fragments $C_1, C_2, \ldots, C_m$. The decoding matrix can be constructed as an inverse of modified distribution matrix 204 using known techniques (which may take into account which data fragments were lost). At least k unique available fragments (either data fragments or coded fragments) may be required to decode a lost data fragment.

FIGS. 3A-3D illustrate a technique for efficiently performing erasure coding within a distributed storage system, according to various embodiments of the disclosure. Like elements may be shown using like reference designators throughout FIGS. 3A-3D.

Figure 3A:
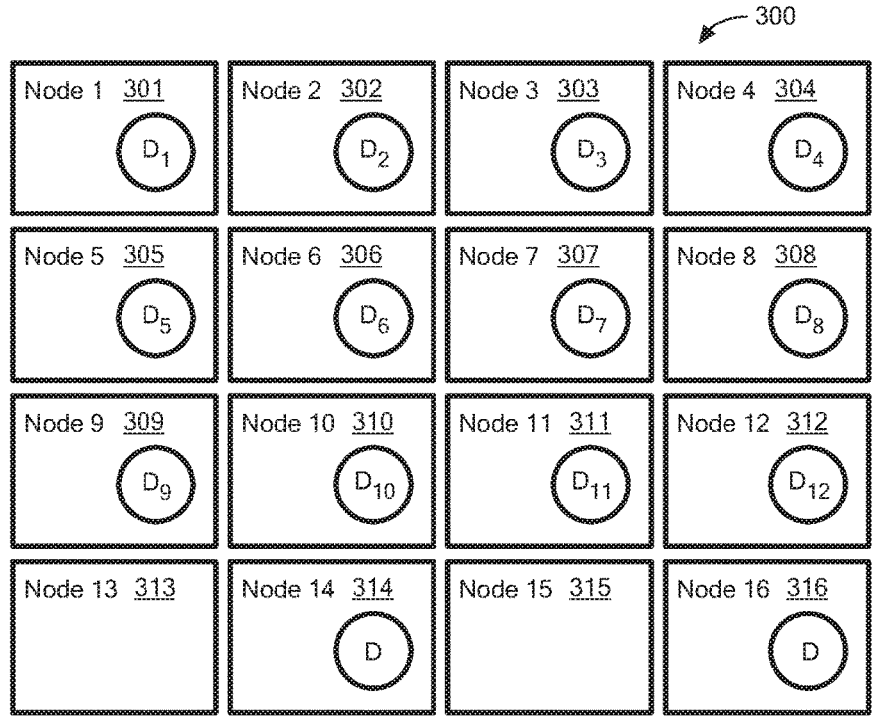
FIGS. 3A-3D are diagrams of illustrative techniques that may be used within a distributed storage system, in accordance with an embodiment of the disclosure.

Referring to FIG. 3A, an illustrative distributed storage system 300 includes a plurality of nodes 301-316, with sixteen (16) nodes shown in this example. Any node 301-316 may be the same or similar to the node 106' of FIG. 1A. When new data D is added to the system (e.g., via a client 102 request), the system 300 divides the data into k fragments $D_1, D_2, \ldots, D_k$, generates m coded fragments $C_1, C_2, \ldots, C_m$ therefrom, and stores the data and coded fragments across various nodes 301-316 using a suitable data layout.

To reduce the amount of time a user/client must wait when storing new data, the system 300 may use a delayed coding technique. As shown by example in FIG. 3A, an arbitrary node 311 receives a request from a client to store data D. Before sending an acknowledgement to the client, the receiving node 311 stores complete copies of the data across multiple different storage nodes. The receiving node 311 may also divide the data fragments and store the fragments across multiple different storage nodes. Notably, the receiving node 311 does not wait for the data to be encoded before sending an acknowledgement to the client. Rather, an acknowledgement can be sent once the data is stored with sufficient redundancy. In some embodiments, this involves storing at least N copies of the data (either complete copies or fragmented copies). In certain embodiments at least three (N=3) copies of the data must be stored before an acknowledgement is sent.

In the example of FIG. 3A, the receiving node stores complete copies of the data on nodes 314 and 316 and stores k=12 data fragments $D_1, D_2, \ldots, D_k$ (the third copy) evenly across nodes 301-312 (i.e., one data fragment per node). It should be understood that the data layout shown in FIG. 3A is merely one example and any suitable data layout can be used.

After an acknowledgement is sent to the client, the node that owns the data D may schedule a erasure coding task to generate m coded fragments $C_1, C_2, \ldots, C_m$. In some embodiments, storage nodes maintain a queue of coding tasks and scheduling a task corresponds to adding a task to an appropriate task queue (sometimes referred to as "enqueuing" a task). In certain embodiments, the erasure coding task is scheduled and executed on the owner node itself. However, if the distributed storage system uses a flat cluster architecture the owner node may not have a local copy of the data. Thus, using this local approach, the owner node might be required to retrieve the data from remote nodes, generating unnecessary network traffic. For example, in FIG. 3A, it would be inefficient to perform the coding process on node 306.

Figure 3B:
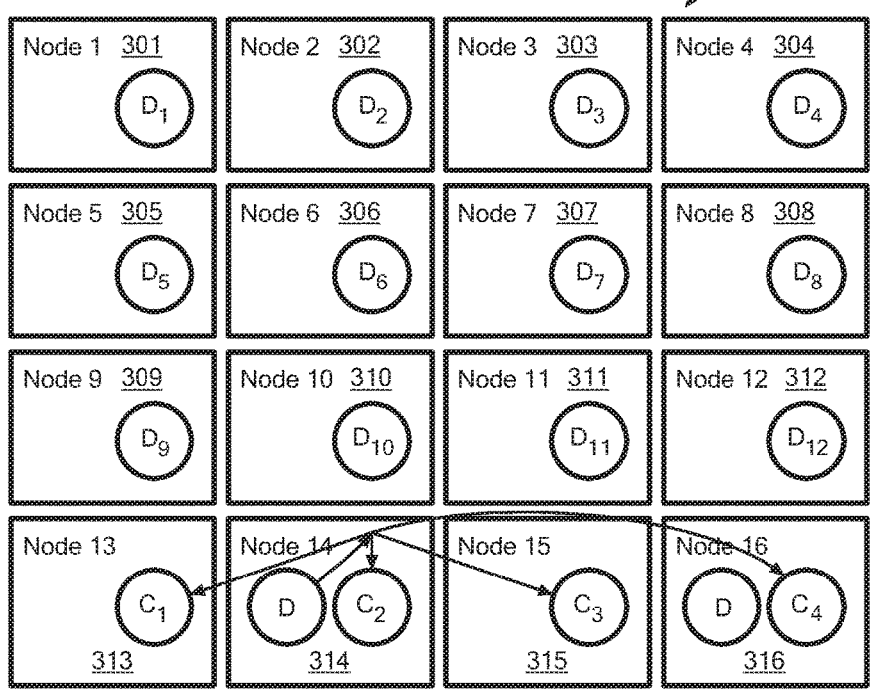

Referring to FIG. 3B, unnecessary network traffic can be eliminated by executing erasure coding tasks on nodes that have a local copy of the data to be encoded. In particular, after an acknowledgement is sent to the client, the node that owns the new data may schedule an erasure coding task on a node that includes a local copy of the data (which may be the owner node itself, or some remote node). If there are multiple remote nodes that have a local copy of the data, the owner node may select one of the nodes using any suitable technique (e.g., random selection or load balancing).

In the example of FIG. 3B, node 306 is assumed to own the newly added D. After sending an acknowledging to the client, the owner node 306 may identify that both nodes 314 and 316 have local copies of the data D. The owner node may then select node 314 at random (or using another technique) and schedule/enqueue an erasure encoding task on that node. The remote node 314 subsequent executes the erasure coding task, which may include reading a copy of the data D from its locally attached storage devices and generating one or more coded fragments $C_1, C_2, \ldots, C_m$ therefrom. In the example of FIG. 3B, the remote node 314 generates m=4 coded fragments.

After the coded fragments are generated, the remote node 314 can store the coded fragments $C_1, C_2, \ldots, C_m$ across multiple different storage nodes according to a desirable data layout. For example, in FIG. 3B, the remote node 314 stores four (4) coded fragments $C_1, C_2, C_3$, and $C_4$ on nodes 313, 314, 315, and 316, respectively.

Once the data fragments and the coded fragments are safely stored, the complete copies of the data D can be deleted. In the example of FIG. 3B, the complete copies can be deleted from nodes 314 and 316.

Figure 3C:
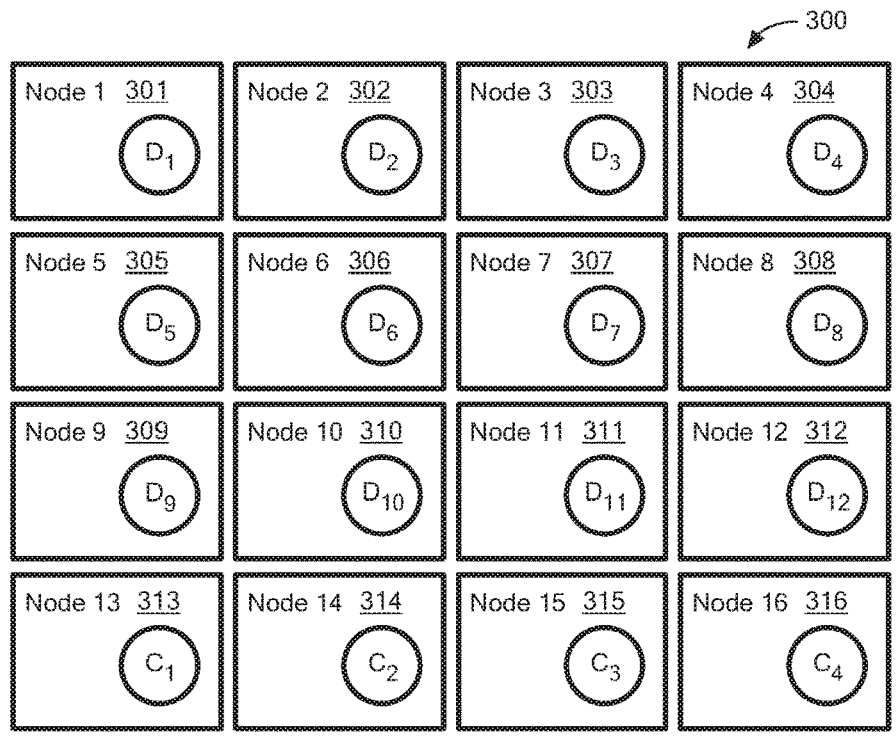

FIG. 3C shows an example of a data layout after erasure coding is completed. In this example, sixteen (16) total fragments—including twelve (12) data fragments $D_1, D_2, \ldots, D_{12}$ and four (4) coded fragments $C_1, C_2, C_3$, and $C_4$—are stored evenly across sixteen nodes 301-316 (i.e., one fragment per node).

Figure 3D:
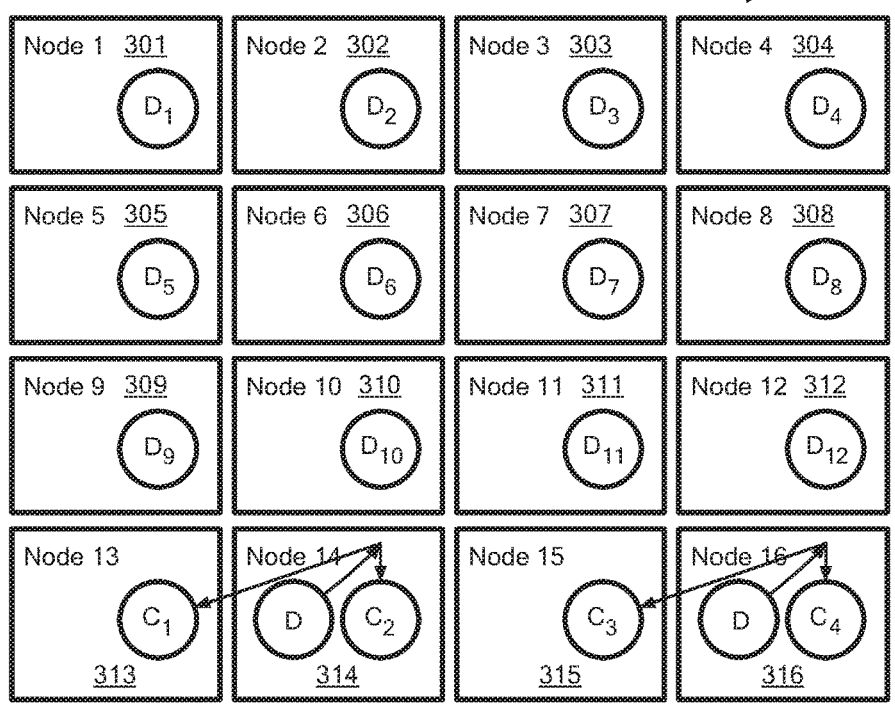

FIG. 3D shows a technique for reducing the overall time required to encode new data, according to an embodiment of the disclosure. Instead of selecting a single node to perform encoding (as in the example of FIG. 3C), the owner node may schedule erasure encoding tasks on multiple remote nodes, which can then be executed in parallel. Each of the erasure coding tasks may specify a subset of the coding fragments to be generated by the specific remote node. As explained above in conjunction with FIG. 2, coding fragments can be individually computed as the dot product of a single row of the coding matrix and the data column vector.

Any suitable technique can be used to schedule coding tasks to multiple different remote nodes. For example, if two nodes have a complete copy of the data D, both of those nodes may be tasked with generating half (i.e., m/2) of the coded fragments.

In the example of FIG. 3D, it is again assumed that node 306 owns newly added data D. After the acknowledgement is sent to the client, the owner node 306 can identify nodes 314 and 316 as having complete copies of the data D. Node 306 may then schedule a first remote erasure coding task on node 314 to generate coded fragments $C_1$ and $C_2$ and schedule a second remote erasure coding task on node 316 to generate coded fragments $C_3$ and $C_4$. Node 314 subsequently reads data D from a locally attached storage device and generates coded fragments $C_1$ and $C_2$. Node 316 does likewise to generate coded fragments $C_3$ and $C_3$. Because the storage nodes 314 and 316 may have independent processing resources, the overall time required to encode the data may be reduced by half.

Figure 4:
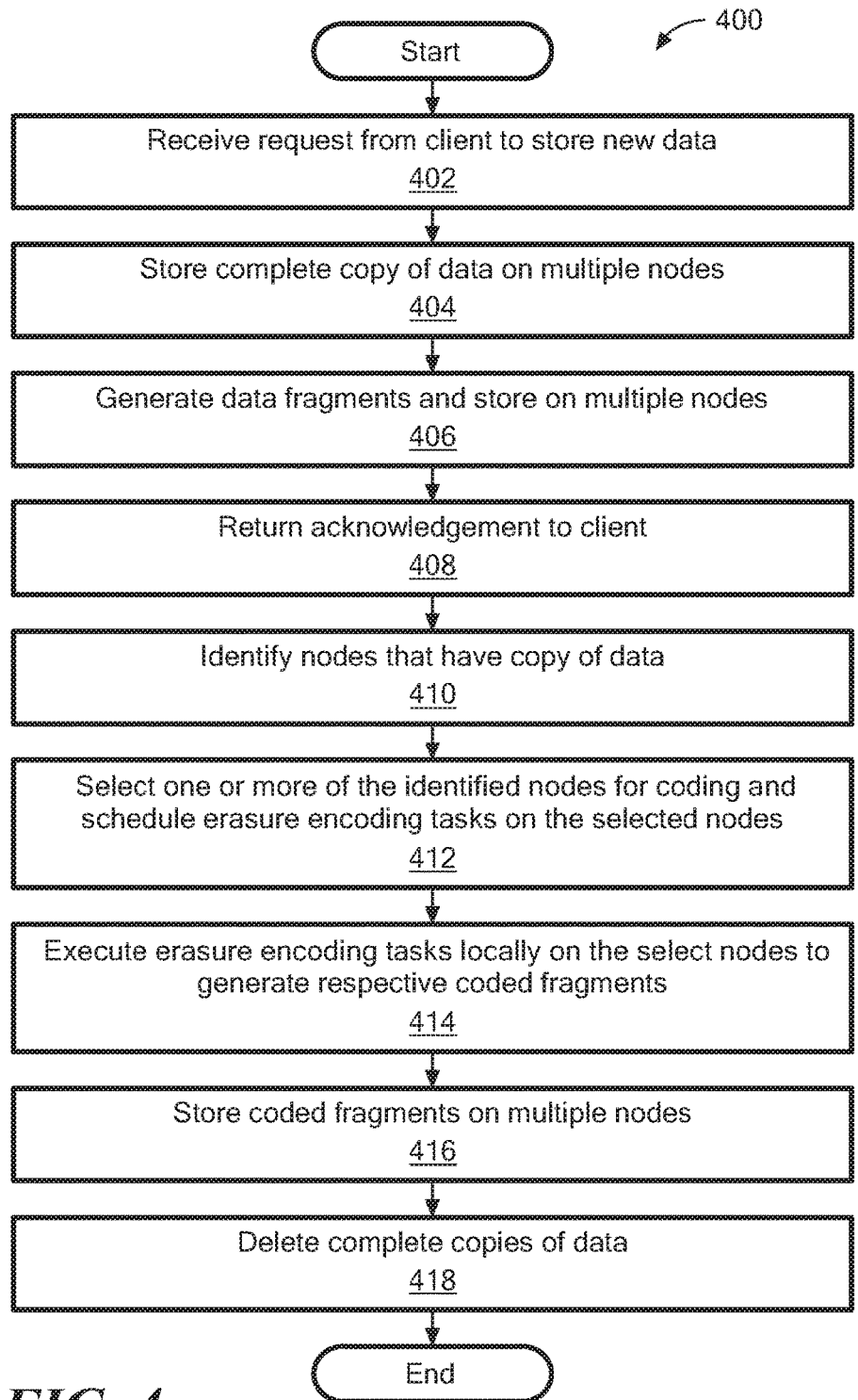
FIG. 4 is a flow diagram showing an illustrative process that may be used within the distributed storage system of FIG. 1, in accordance with an embodiment of the disclosure.

FIG. 4 is a flow diagram showing illustrative processing that can be implemented within one or more storage nodes 106 of a storage cluster 104 (FIG. 1), according to an embodiment of the disclosure. Rectangular elements (typified by element 402) herein denoted "processing blocks," represent computer software instructions or groups of instructions. Alternatively, the processing blocks may represent steps performed by functionally equivalent circuits such as a digital signal processor circuit or an application specific integrated circuit (ASIC). The flow diagram does not depict the syntax of any particular programming language. Rather, the diagram illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 4 an illustrative process 400 begins at block 402, where a request to store new data may be received by a client (e.g., a user application). The request may be received and processed by an arbitrary storage node 104 (FIG. 1). At block 404, a complete copy of the data is stored on at least two different storage nodes. At block 406, the data may be divided into a plurality of fragments, and the data fragments may be stored across multiple different storage nodes. Any suitable data layout can be used. After the new data is stored across multiple storage devices, an acknowledgement may be returned to the client (block 408).

The new data is owned by a storage node, which does not necessarily have local copy of the data. At block 410, the owner node identifies that multiple nodes that include a complete copy of the data and selects one or more of those nodes for erasure coding. At block 412, the owner node schedules remote erasure coding tasks on each of the selected nodes. In some embodiments, the owner node tasks different remote nodes with generating different coded fragments.

At block 414, the erasure encoding tasks are executed locally on each of the selected nodes to generate coded fragments. If multiple nodes are selected, the encoding tasks may be performed in parallel. At block 416, the coded fragments are stored across multiple storage nodes. After the coded fragments are stored, the complete copies of the data can be deleted from the cluster (block 418).

Figure 5:
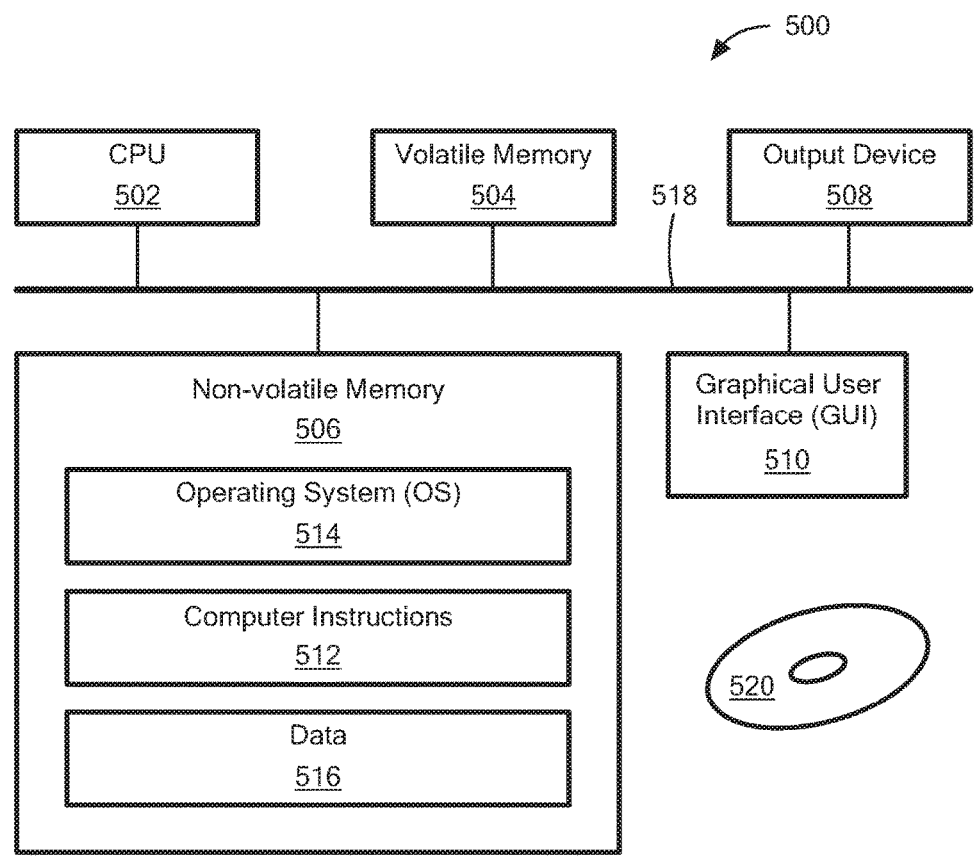
FIG. 5 is a schematic representation of an illustrative computer for use with the systems of FIGS. 1 and 1A, in accordance with an embodiment of the disclosure.

FIG. 5 shows an illustrative computer or other processing device 500 that can perform at least part of the processing described herein, in accordance with an embodiment of the disclosure. The computer 500 includes a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 stores computer instructions 512, an operating system 514, and data 516. In one example, the computer instructions 512 are executed by the processor 502 out of volatile memory 504. In one embodiment, an article 520 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method for use with a distributed storage system comprising a plurality of storage nodes each having attached storage devices, the method comprising:
   receiving a request from a client to store data;
   storing a copy of the data within the storage devices attached to a first storage node;
   storing a copy of the data within the storage devices attached to a second storage node;
   returning an acknowledgement to the client in response to the request the acknowledgment being returned after a threshold number of copies is stored on storage devices attached to at least some of the plurality of storage nodes, the threshold number being greater than one;
   scheduling a first erasure encoding task on the first storage node;
   scheduling a second erasure encoding task on the second storage node;
   executing, on the first storage node, the first erasure encoding task to generate a first plurality of coded fragments using the copy of the data stored within attached storage devices, the first erasure encoding task being executed after the acknowledgement is returned;
   executing, on the second storage node, the second erasure encoding task to generate a second plurality of coded fragments using the copy of the data stored within attached storage devices, the second erasure encoding task being executed after the acknowledgement is returned; and
   storing the first and second pluralities of coded fragments within storage devices attached to at least two different storage nodes.

2. The method of claim 1 wherein returning an acknowledgement to the client occurs before scheduling the first or second erasure encoding tasks.

3. The method of claim 1 further comprising:
   dividing the data into a plurality of data fragments; and
   storing the plurality of data fragments within storage devices attached to at least two different storage nodes.

4. The method of claim 3 wherein the at least two different storage nodes in which the data fragments are stored are each different from the at least two different storage nodes in which the first and second pluralities of coded fragments are stored.

5. The method of claim 3 wherein the data fragments each have the same size.

6. The method of claim 1 further comprising:
   deleting the copy of the data from the storage devices attached to the first storage node; and
   deleting the copy of the data from the storage devices attached to the second storage node.

7. The method of claim 1 wherein the first and second erasure encoding tasks are executed in parallel.

8. The method of claim 1 wherein scheduling the first erasure encoding task on the first storage node comprises adding the first erasure encoding task to a queue within the first storage node.

9. The method of claim 1, wherein the first erasure encoding task is executed based on a distribution matrix including one or more first portions and one or more second portions, each of the first portions including a respective identity matrix, and each of the second portions including a respective coding matrix.

10. A distributed storage system, comprising:
    a plurality of storage nodes having attached storage devices;
    a first storage node from the plurality of storage nodes having attached storage devices and configured to:
    receive a request from a client to store data;
    store a copy of the data within the storage devices attached to a second storage node;
    store a copy of the data within the storage devices attached to a third storage node;
    return an acknowledgement to the client in response to the request, the acknowledgment being returned after a threshold number of copies is stored on storage devices attached to at least some of the plurality of storage nodes the threshold number being greater than one;
    schedule a first erasure encoding task on the second storage node; and
    schedule a second erasure encoding task on the third storage node;
    the second storage node from the plurality of storage nodes having attached storage devices and configured to:
    execute the first erasure encoding task to generate a first plurality of coded fragments using the copy of the data stored within attached storage devices, the first erasure encoding task being executed after the acknowledgement is returned; and
    store the first plurality of coded fragments within storage devices attached to at least two different storage nodes; and
    the third storage node from the plurality of storage nodes having attached storage devices and configured to:
    execute the second erasure encoding task to generate a second plurality of coded fragments using the copy of the data stored within attached storage devices, the second erasure encoding task being executed after the acknowledgement is returned; and
    store the second plurality of coded fragments within storage devices attached to at least two different storage nodes.

11. The distributed storage system of claim 10 wherein the first storage node is configured to return an acknowledgement to the client occurs before scheduling the first or second erasure encoding tasks.

12. The distributed storage system of claim 10 wherein the first storage node is configured to:
    divide the data into a plurality of data fragments; and
    store the plurality of data fragments within storage devices attached to at least two different storage nodes.

13. The distributed storage system of claim 12 wherein the at least two different storage nodes in which the data fragments are stored are each different from the at least two different storage nodes in which the first and second pluralities of coded fragments are stored.

14. The distributed storage system of claim 12 wherein the data fragments each have the same size.

15. The distributed storage system of claim 10 wherein the second storage node is further configured to delete the copy of the data from the storage devices attached to the first storage node and wherein the third storage node is further configured to delete the copy of the data from the storage devices attached to the second storage node.

16. The distributed storage system of claim 10 wherein the first and second erasure encoding tasks are executed in parallel.

17. The distributed storage system of claim 10 wherein the first storage node is configured to add the first erasure encoding task to a queue within the second storage node.

18. The system of claim 10, wherein the first erasure encoding task is executed based on a distribution matrix including one or more first portions and one or more second portions, each of the first portions including a respective identity matrix, and each of the second portions including a respective coding matrix.

\* \* \* \* \*